United States Patent
De Vos et al.

(10) Patent No.: US 12,465,058 B2
(45) Date of Patent: Nov. 11, 2025

(54) METHOD AND DEVICE FOR PROCESSING A CARCASS-PART OF SLAUGHTERED POULTRY

(71) Applicant: Meyn Food Processing Technology B.V., Oostzaan (NL)

(72) Inventors: Ferdinand Allard De Vos, Oostzaan (NL); Michael George Lourentius Koopman, Oostzaan (NL); Marcel Verhagen, Oostzaan (NL); Pieter Willem Vonk, Oostzaan (NL); Jeroen Hermanus Wijtten, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 27 days.

(21) Appl. No.: 17/880,309

(22) Filed: Aug. 3, 2022

(65) Prior Publication Data
US 2023/0042295 A1 Feb. 9, 2023

(30) Foreign Application Priority Data
Aug. 3, 2021 (NL) .................................. 2028907

(51) Int. Cl.
*A22C 21/00* (2006.01)
(52) U.S. Cl.
CPC ................... *A22C 21/0069* (2013.01)
(58) Field of Classification Search
CPC .................. A22C 21/0046; A22C 21/0069
USPC ......................... 452/135, 136, 151
See application file for complete search history.

(56) References Cited

U.S. PATENT DOCUMENTS

| | | | | |
|---|---|---|---|---|
| 3,946,461 A | * | 3/1976 | Martin | A22C 21/0023 452/165 |
| 5,545,083 A | * | 8/1996 | Bargele | A22C 21/0069 452/136 |
| 8,500,522 B2 | * | 8/2013 | Drabbels | A22C 21/0069 452/136 |
| 8,529,322 B2 | * | 9/2013 | De Vos | A22C 21/0069 452/165 |
| 8,801,508 B2 | * | 8/2014 | Landt | A22C 21/0069 452/135 |
| 10,130,106 B2 | * | 11/2018 | Van Esbroeck | B26D 1/04 |
| 2004/0132395 A1 | | 7/2004 | Van Den Nieuwelaar et al. | |

FOREIGN PATENT DOCUMENTS

| | | |
|---|---|---|
| EP | 2289340 A2 | 3/2011 |
| KR | 102121204 B1 | 6/2020 |

OTHER PUBLICATIONS

Search Report for NL Patent Application No. 2028907 dated Apr. 14, 2021 (3 pages).

* cited by examiner

*Primary Examiner* — David J Parsley
(74) *Attorney, Agent, or Firm* — Dority & Manning, P.A.

(57) ABSTRACT

A device for processing a carcass-part of slaughtered poultry in a processing line can include a tool having a primary knife and two secondary knives arranged on opposite sides of a bottom knife to disconnect a wishbone. A tertiary knife can be positionable adjacent to the two secondary knives on a side of the blades opposite to the side where the primary knife is positioned or positionable so as to define a cage for trapping the wishbone in the cage.

14 Claims, 15 Drawing Sheets

Fig. 1

PRIOR ART

METHOD AND DEVICE FOR PROCESSING A CARCASS-PART OF SLAUGHTERED POULTRY

PRIORITY STATEMENT

The present application claims priority under 35 U.S.C. § 119 to Dutch patent application No. 2028907, filed on Aug. 3, 2021.

FIELD OF THE INVENTION

The subject matter of the present disclosure relates generally to a method and device for processing a carcass-part of slaughtered poultry in a processing line.

BACKGROUND OF THE INVENTION

A method and device are known from EP-A-2 289 340 and from EP-A-2 606 737.

In the method and device of EP-A-2 289 340, the wishbone legs are cut for removal of the wishbone. In this known method of EP-A-2 289 340, the wishbone is first disconnected from a first membrana and/or ligament with which it attaches to the remainder of the carcass by introducing a tool for cutting the membrana and/or removing of the wishbone into the carcass. Thereafter the tool is operated for cutting the legs of the wishbone and for penetrating and/or cutting a further membrana that connects the wishbone to the keelbone.

In the method and device of EP-A-2 606 737 which is incompatible with the method and device of EP-A-2 289 340, no cutting of the wishbone legs is performed, but an arrow shaped knife and two secondary knives on opposite sides of the knife are moved in a unitary movement from within the carcass-part in a direction away from the carcass-part so as to turn the wishbone legs while they are still connected to the wing joints, so as to eventually completely detach the wishbone legs from the wing joints of the carcass-part.

BRIEF DESCRIPTION OF THE INVENTION

In one exemplary aspect, it is an object of the invention to further increase the yield of meat on the carcass parts processed with the method and device according to the preamble.

In another exemplary aspect, it is a further object of the invention to further limit the chances that bone splinters will remain on or in the carcass parts that are processed with the method and device.

In another exemplary aspect, it is a further object of the invention to limit the chances of bone splinters remaining at the carcass parts when the carcass parts are processed with pre-broken wishbones.

In one exemplary aspect, the subject matter of the present disclosure relates generally to a method and device for processing a carcass-part of slaughtered poultry in a processing line, which carcass-part is supported on a carrier that is movable in the processing line and includes wing-joints, coracoids, a wishbone embodied with two legs that merge into each other at an acute angle in a wishbone head, a keelbone, at least one membrana and/or ligament that connects at least to the wishbone, and naturally present meat including inner and outer fillets. In this exemplary embodiment, the device may include a tool for cutting the membrana and removing of the wishbone from the carcass-part. The tool may includes a primary knife and two secondary knives arranged on opposite sides of the primary knife to disconnect the wishbone from the at least one membrana and/or ligament while retaining the naturally present meat on the carcass-part.

The instant invention generally may apply to both situations wherein the wishbone legs may be cut or wherein the wishbone legs may not be cut prior to removal of the wishbone from the carcass-part.

In another exemplary aspect, present disclosure relates generally to a method and device for processing a carcass-part of slaughtered poultry in a processing line, which carcass-part is supported on a carrier that is movable in the processing line and includes wing-joints, coracoids, a wishbone embodied with two legs that merge into each other at an acute angle in a wishbone head, a keelbone, at least one membrana and/or ligament that connects at least to the wishbone, and naturally present meat including inner and outer fillets. The device may include a tool for cutting the membrana and removing of the wishbone from the carcass-part, the tool may include a primary knife and two secondary knives arranged on opposite sides of the primary knife to disconnect the wishbone from the at least one membrana and/or ligament while retaining the naturally present meat on the carcass-part.

According to an exemplary aspect of the invention, the tool for cutting the membrana and removing of the wishbone from the carcass-part further may include a tertiary knife positioned or positionable adjacent to the two secondary knives on a side of the blades opposite to the side where the primary knife is positioned or positionable so as to define a cage for trapping at least part of the wishbone, and preferably the wishbone head, in the cage delimited by the primary knife, the two secondary knives and the tertiary knife.

Accordingly to another exemplary aspect, the invention may also be embodied in a method for processing a carcass-part of slaughtered poultry in a processing line, wherein the carcass-part is supported on a carrier that is movable in the processing line, wherein the carcass-part includes wing-joints, coracoids, a wishbone embodied with two legs that merge into each other at an acute angle in a wishbone head, a keelbone, at least one membrana and/or ligament that connects at least to the wishbone, and naturally present meat including inner and outer fillets. The method may include processing that is performed with a device including a primary knife, two secondary knives and a tertiary knife, such that after trapping at least part of the wishbone in a cage delimited by the primary knife, the two secondary knives and the tertiary knife, the cage with the at least part of the wishbone trapped therein is moved away from the carcass part so as to remove the at least part of the wishbone from the carcass part also effectively traps bone splinters that may have been caused before or during the formation of the cage.

The proper operation of an exemplary device of the invention is promoted by arranging that the tertiary knife has a forward cutting edge.

The manner of movement of the cage away from the carcass part with the at least part of the wishbone trapped therein, is not essential; it can be a linear movement or a rotational movement, although a rotational movement is preferred.

Preferably, in one exemplary aspect, the primary knife cuts the wishbone legs close to the knuckles when moving in the first direction.

Further it is desirable in some exemplary embodiments that the two secondary knives while progressing along the wishbone legs move forward synchronously with the primary knife.

In order to support exemplary methods of the invention, it is desirable that after formation of the cage by positioning of the primary knife, the two secondary knives and the tertiary knife, the tertiary knife is jointly movable with the two secondary knives and with the primary knife for removal of the at least part of the wishbone while being trapped in the cage.

In a particular exemplary aspect, the cage is arranged to move so as to have the wishbone perform a restricted rotation with reference to the wing joints. While completing the cage, the primary knife and the two secondary knifes may cut the membrana and/or ligament loose from the wishbone.

Advantageously the primary knife is at its forward end may be equipped with a recess which is arranged for receipt of the wishbone head. This keeps the wishbone head perfectly in place while the wishbone is moved by the movement of the primary knife, even with a dislocated wishbone or pre-broken wishbone legs.

It is further preferable for certain embodiments that the two secondary knives may be provided with, preferably sharp, thickenings in a selected region behind the forward ends of the two blades, which thickenings are oriented towards each other and inwardly of the cage. These thickenings cut the fillets.

It is possible albeit not essential that the primary knife is provided with cutting side edges for cutting the wishbone legs during the formation of the cage while the at least part of the wishbone is trapped in the cage. This promotes the ease of removal of (these parts of) the wishbone.

In certain exemplary embodiments, preferably for the formation of the cage, the primary knife, the two secondary knives and the tertiary knife are arranged to be operational in a preselected sequence, wherein the primary knife moves forward in a first direction to a position near to the wishbone head, followed by a movement of the primary knife towards the wishbone head in a second direction being transverse to the first direction so as to engage and move the wishbone head in the second direction. These initial movements of the primary knife serve the purpose of precisely positioning the wishbone. Thereafter the formation of the cage is completed so as to trap the wishbone or at least part thereof inside the cage.

It is preferred that the two secondary knives progressing along the wishbone legs are arranged to move synchronously with the primary knife.

Alternatively the two secondary knifes are arranged to progress along the wishbone legs before the primary knife moves forward.

In exemplary embodiments, it may be preferable that the two secondary knives and/or the tertiary knife are arranged to scratch over the wishbone legs. This applies during the sequence of operations that lead to the formation of the cage and is desirable because it promotes the yield of meat.

In another exemplary aspect of the invention, the device is in position adjustable with reference to the carrier that is movable in the processing line, wherein the position of the device depends on a monitoring tool which is arranged for establishing a size of the carcass part to be processed. This also promotes the yield of meat.

Advantageously the device of the invention may be provided with a pushing organ or organs for pushing the wishbone legs together and/or pushing the fillets away from the wishbone head, thus increasing the yield of meat. When a wishbone is pre-broken, so broken before it is processed by the device of the invention, it is in far most cases broken at the wishbone head, meaning that the wishbone is still attached to the wing-knuckle. When knives, in whatever sequence, come in the poultry carcass, the knives will at first pass the still fixed or positioned part of the pre-broken wishbone. The knives entering further into the poultry carcass can dislocate the wishbone legs due to the bones being broken, but still connected to a membrane and between muscles. The pushing organs ensure to push the broken legs inwards in the cage.

Other beneficial features may include that the device is provided with secondary knives or guides to pave the way for the removal of the wishbone from the carcass part.

These and other objects of the invention, which will become apparent from the following disclosure are promoted, by the features of one or more of the appended claims. In the following disclosure of exemplary embodiments of the invention, any aspect or feature, or part of such feature as disclosed herein may be used separate from any other feature or in combination with any other feature or in combination with any part of such other feature as disclosed herein, wherein any such use of part of a feature or combination of features may be tailored as the need may arise to address certain objectives, which need not be necessarily disclosed herein.

BRIEF DESCRIPTION OF THE DRAWINGS

The invention will hereinafter be further elucidated with reference to the drawing of exemplary embodiments of a device according to the invention that is not limiting as to the appended claims.

In the drawings.

Whenever in the figures the same reference numerals are applied, these numerals refer to the same parts.

DETAILED DESCRIPTION OF THE INVENTION

Figure 1:
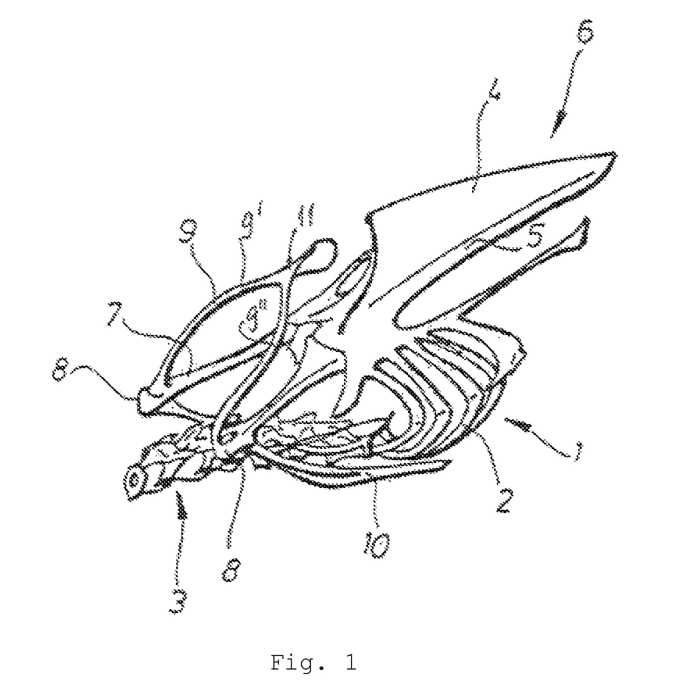
FIG. 1 schematically shows the bones of a carcass-part of slaughtered poultry.

Taking first reference to FIG. 1, the bone structure of a carcass-part 1 is shown. Apart from the (not shown) meat that naturally is present, the carcass-part 1 has ribs 2 connected to the vertebral column 3. At the breast side the carcass-part 1 is provided with the breastbone crest 4 and the breastbone plate 5. Together they are referred to as the breastbone or keelbone 6. Further FIG. 1 shows that the carcass-part 1 is provided with a shoulder blade or scapula 10, and that there are wing-joints 8 on one side connected to the coracoids 7, and at the other side connected to the wishbone 9 having legs 9' and 9" that merge into each other at the wishbone head 11.

Figure 2:
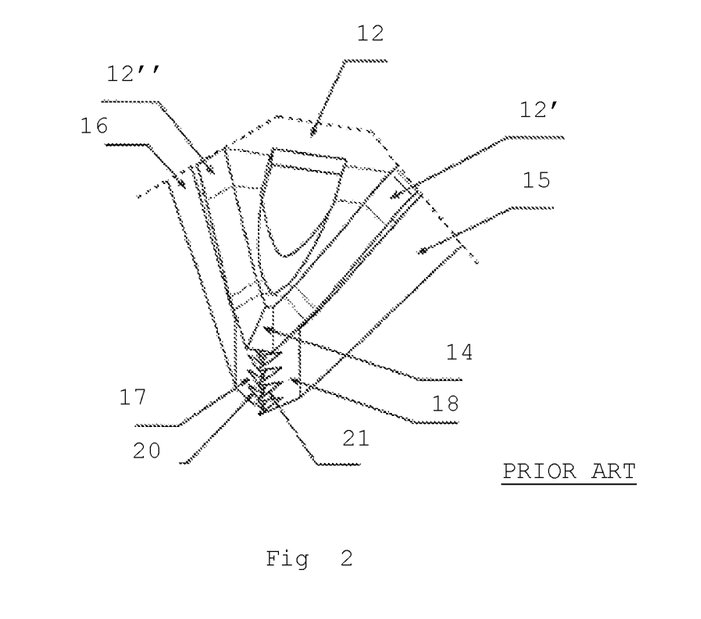
FIG. 2 shows a detailed view of a device of the prior art, including a tool with a primary knife and two secondary knives arranged on opposite sides of the primary knife.

For the exemplary embodiment show, the device is arranged for processing a carcass-part 1 of slaughtered poultry in a processing line, whereby the carcass-part 1 is supported on a carrier that moves in the processing line. Such an arrangement is known for decades from daily practice in the poultry industry, so that the showing thereof in the drawing can be dispensed with. In a known arrangement it is preferable that the device or devices of the invention cooperate with a carousel along which the processing line is guided. Any person with ordinary skill in the art is knowledgeable with such an arrangement of carriers that move in a processing line for the purpose of processing carcass-parts that are supported by such carriers through the processing line, whilst the carcass-parts are being processed by devices arranged in or next to the processing line. For that purpose it is known that the carousel includes cam-tracks which are intended to cooperate with guide wheels connected with the primary knife, the two secondary knifes and the tertiary knife of the device of exemplary embodiments of the invention Taking reference now to FIG. 2, a detailed view is offered to exemplary knife 12, showing its arrow shape with an arrow point 14. Further FIG. 2 shows that two secondary knives 15, 16 are arranged on opposite sides of the knife 12. The blades 15, 16 are preferably arranged to be independently movable with respect to the knife 12, and are provided with forward edges 17, 18 that are intended for cutting any membrana and/or ligament that connects to the wishbone, in particular the membrana that connects the wishbone to the keelbone in order to enable completely releasing the wishbone 9 from the remainder of the carcass-part 1.

It is possible although not essential that the knife 12 is provided with cutting side edges 12', 12" which cause that when the knife 12 is introduced between the legs 9', 9" of the wishbone 9 and moved up to a position wherein eventually the arrow's point 14 of the knife 12 approaches the wishbone head 11 where the legs 9', 9" of the wishbone 9 merge into each other, the the cutting side edges 12', 12" of the knife 12 cut the legs 9', 9" of the wishbone 9 at a position immediately adjacent to the knuckles or wing-joints 8 to which the wishbone 9 connects.

FIGS. 3 through 8 and FIGS. 9 through 14 show a first and second embodiment respectively for processing a carcass part 1 of slaughtered poultry in a processing line. Both embodiments are embodied with a tool 12, 15, 16, 22 for cutting the membrana and removing of the wishbone 9 from the carcass-part 1. As clearly depicted in FIGS. 3 through 9, the exemplary tool 12, 15, 16, 22 includes a primary knife 12 and two secondary knives 15, 16 arranged on opposite sides of the primary knife 12, which are used to disconnect the wishbone 9 from the at least one membrana and/or ligament while retaining the naturally present meat on the carcass-part 1.

The exemplary tool 12, 15, 16, 22 further includes a tertiary knife 22 positioned or positionable adjacent to the two secondary knives 15, 16 on a side of the blades opposite to the side where the primary knife 12 is positioned or positionable so as to define a cage for trapping the wishbone 9, or at least part thereof such as the wishbone head, in the cage delimited by the primary knife 12, the two secondary knives 15, 16 and the tertiary knife 22. The manner in which the tool is preferably operated will be explained hereinafter with reference to the two exemplary embodiments of FIGS. 3-8 and FIGS. 9-14. It must be understood however that the following discussion of the method of operation is not the only possible way of operating and that variations thereto are possible within the scope of the appended claims.

Figure 3:
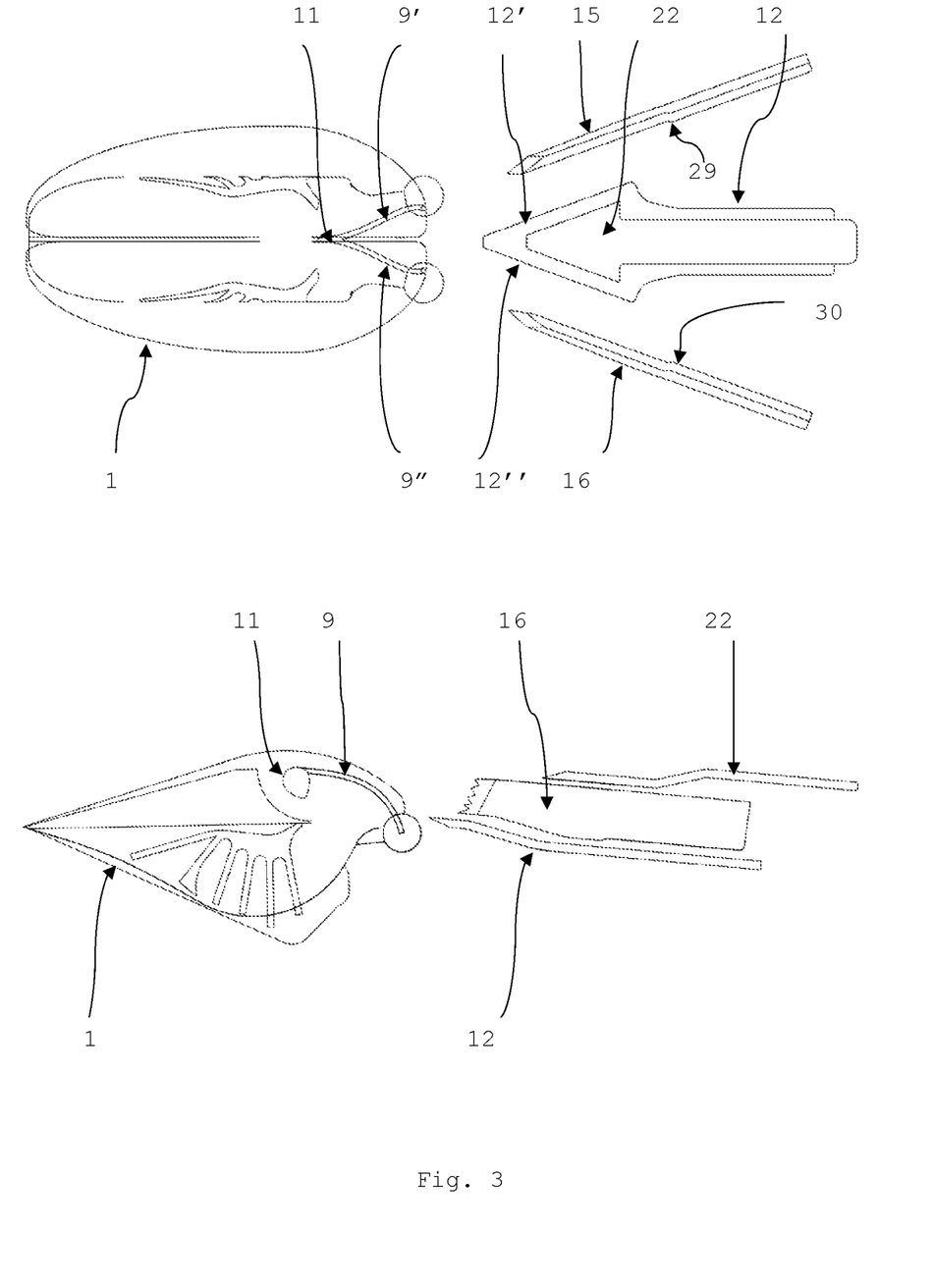
FIGS. 3 through 8 show a first embodiment of a device and a method of operating such device according to the invention.
Figure 4:
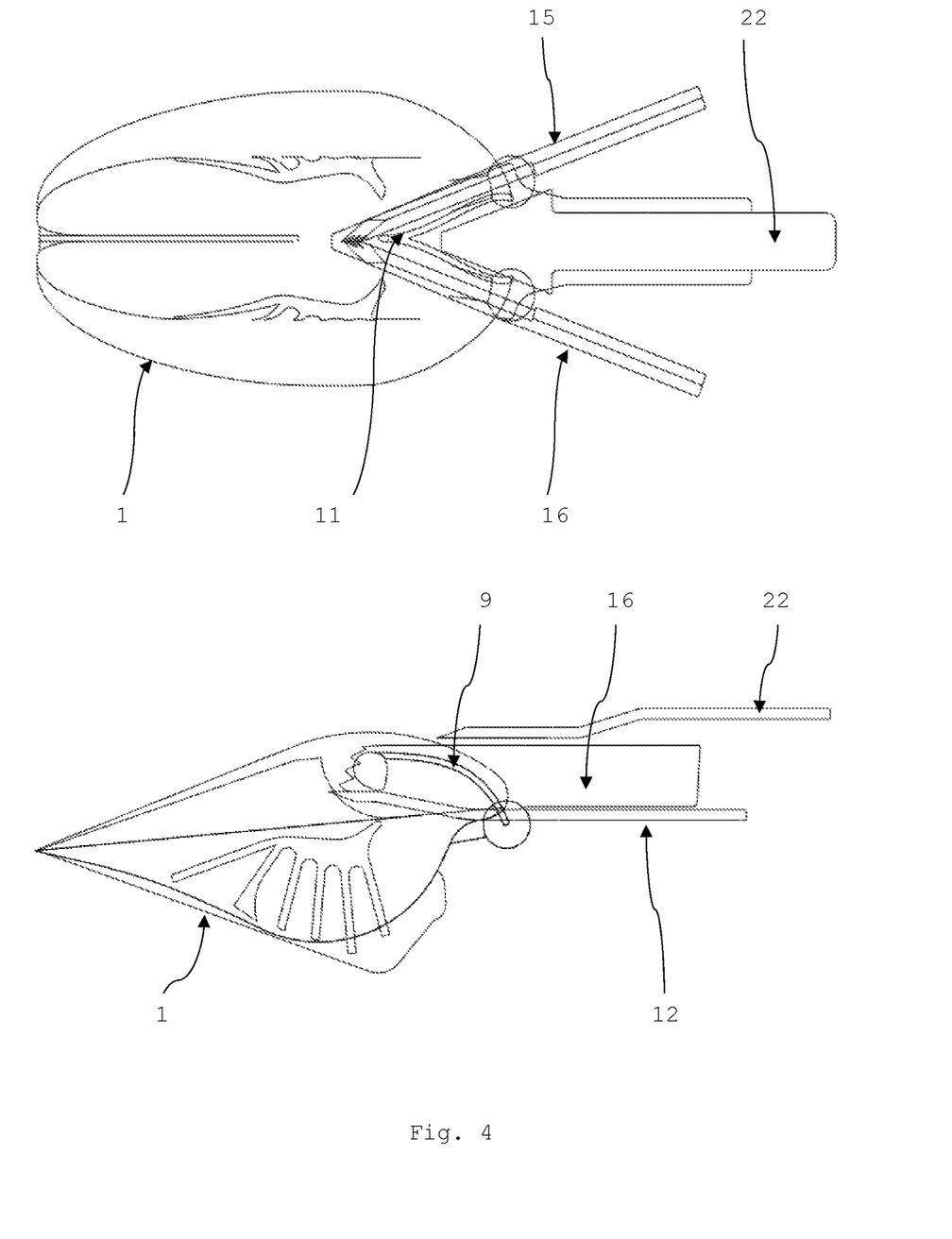
Figure 9:
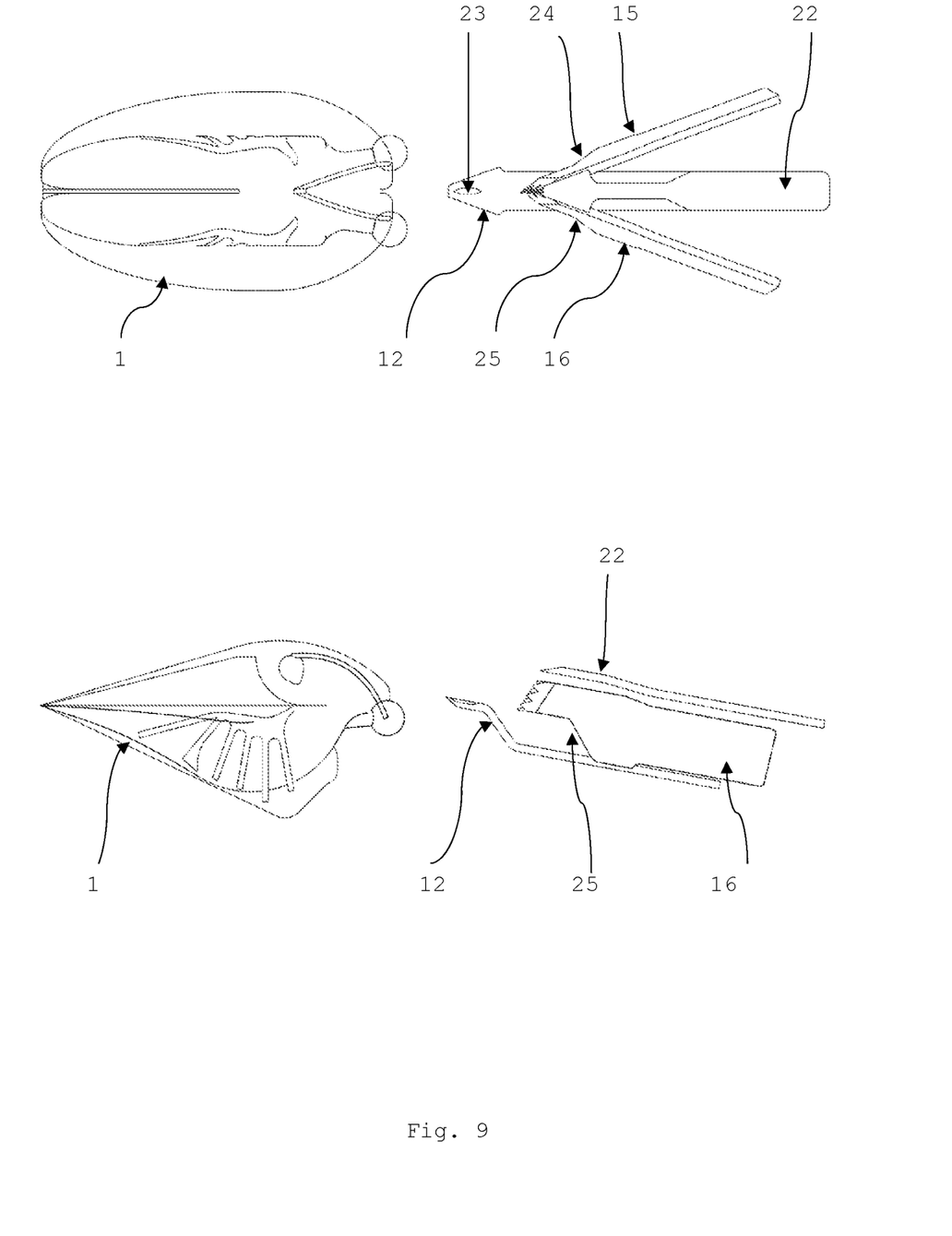
FIGS. 9 through 14 show a second embodiment of a device and a method of operating such device according to the invention.
Figure 10:
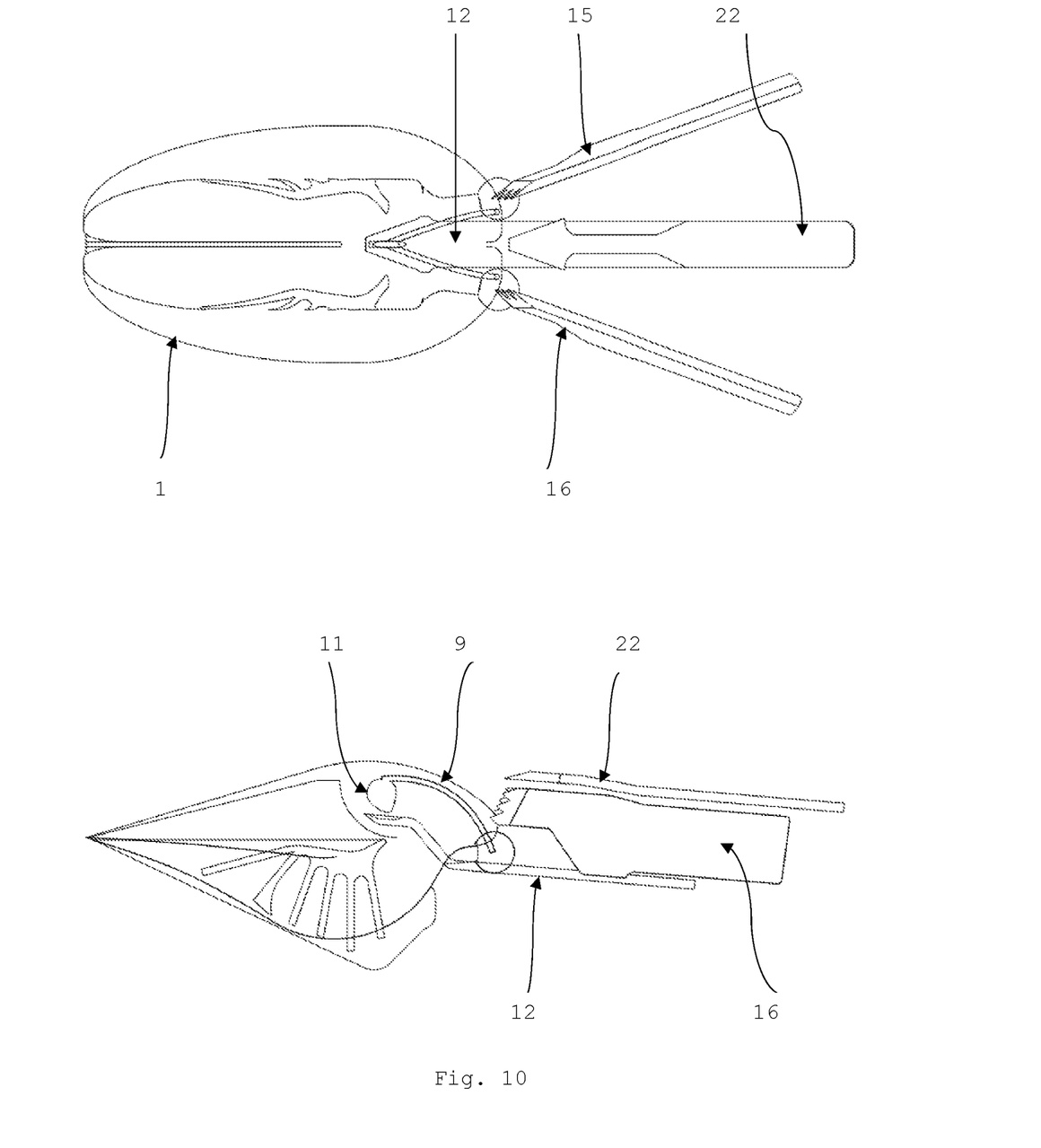

The difference between the two exemplary embodiments is immediately apparent with reference to FIG. 3 of the first embodiment and FIG. 9 of the second embodiment. In FIG. 3, the primary knife 12 is relatively wide, whereas in FIG. 9 the primary knife 12 is relatively narrow. This results in cutting of the wishbone legs 9', 9" when introducing the wide primary knife 12 of FIG. 4 into the carcass 1 underneath the wishbone head 11. Contrary thereto, when the narrow primary knife 12 of FIG. 4 10 is introduced into the carcass 1 underneath the wishbone head 11, this occurs without cutting the wishbone legs 9', 9". Particularly in the first embodiment of FIG. 4 4 the primary knife 12 is therefore provided with cutting side edges 12', 12" for cutting the wishbone legs 9', 9" during this initial stage of the formation of the cage wherein eventually the wishbone 9 will be trapped.

The primary knife 12 can at its forward end be equipped with a recess 23 (see FIG. 9) Which is arranged for receipt of the wishbone head 11 so as to secure the accurate positioning of the wishbone 9 relative to the primary knife 12. Best results with this recess 23 can be achieved in combination with the relatively smaller primary knife 12 of the embodiment of FIGS. 9-14.

FIG. 9 further shows that the two secondary knifes 15, 16 are provided with, preferably sharp, thickenings 24, 25 in a selected region behind the forward ends of the two secondary knifes 15, 16, which thickenings 24, 25 are oriented towards each other and inwardly of the cage to be formed.

Figure 5:
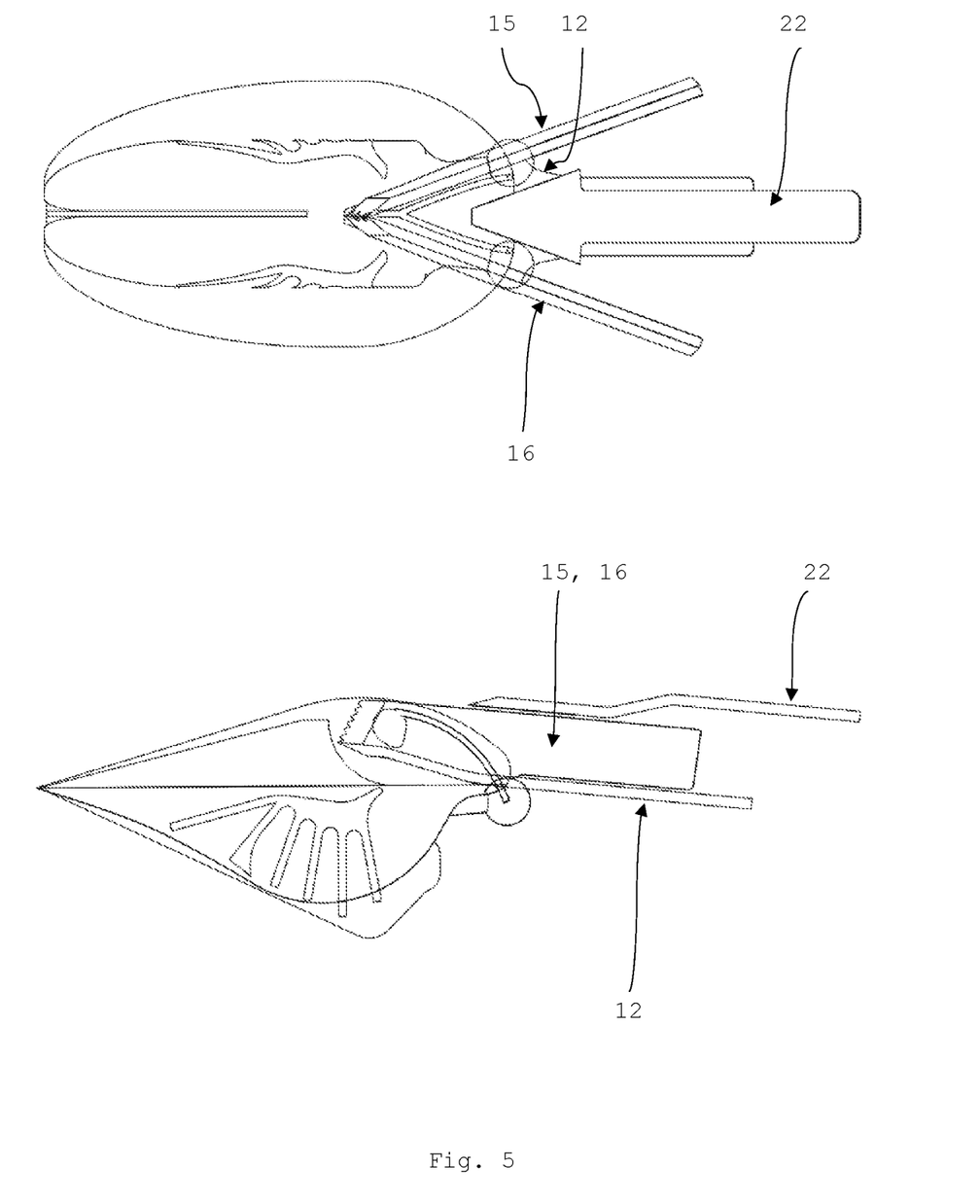
Figure 6:
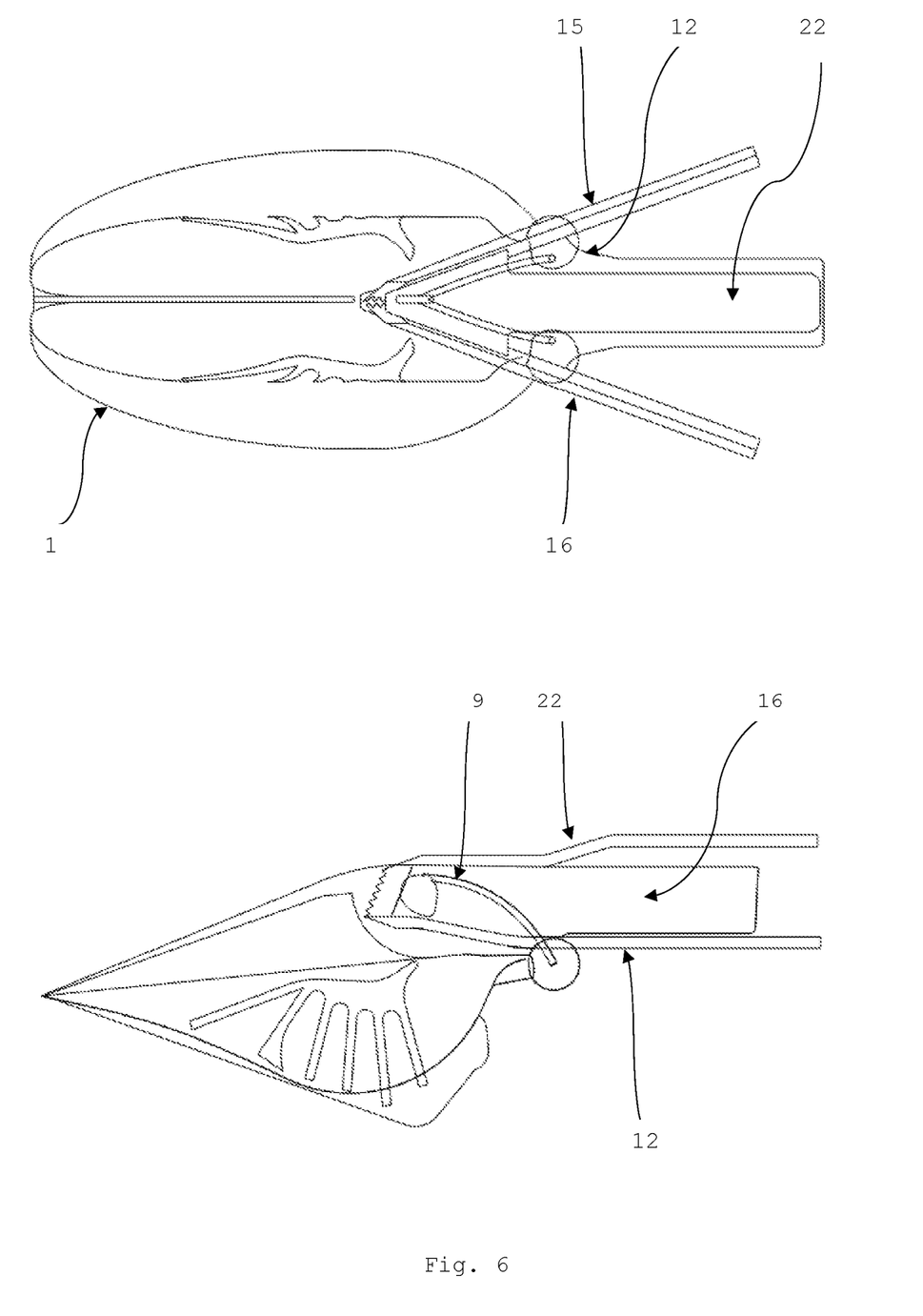
Figure 11:
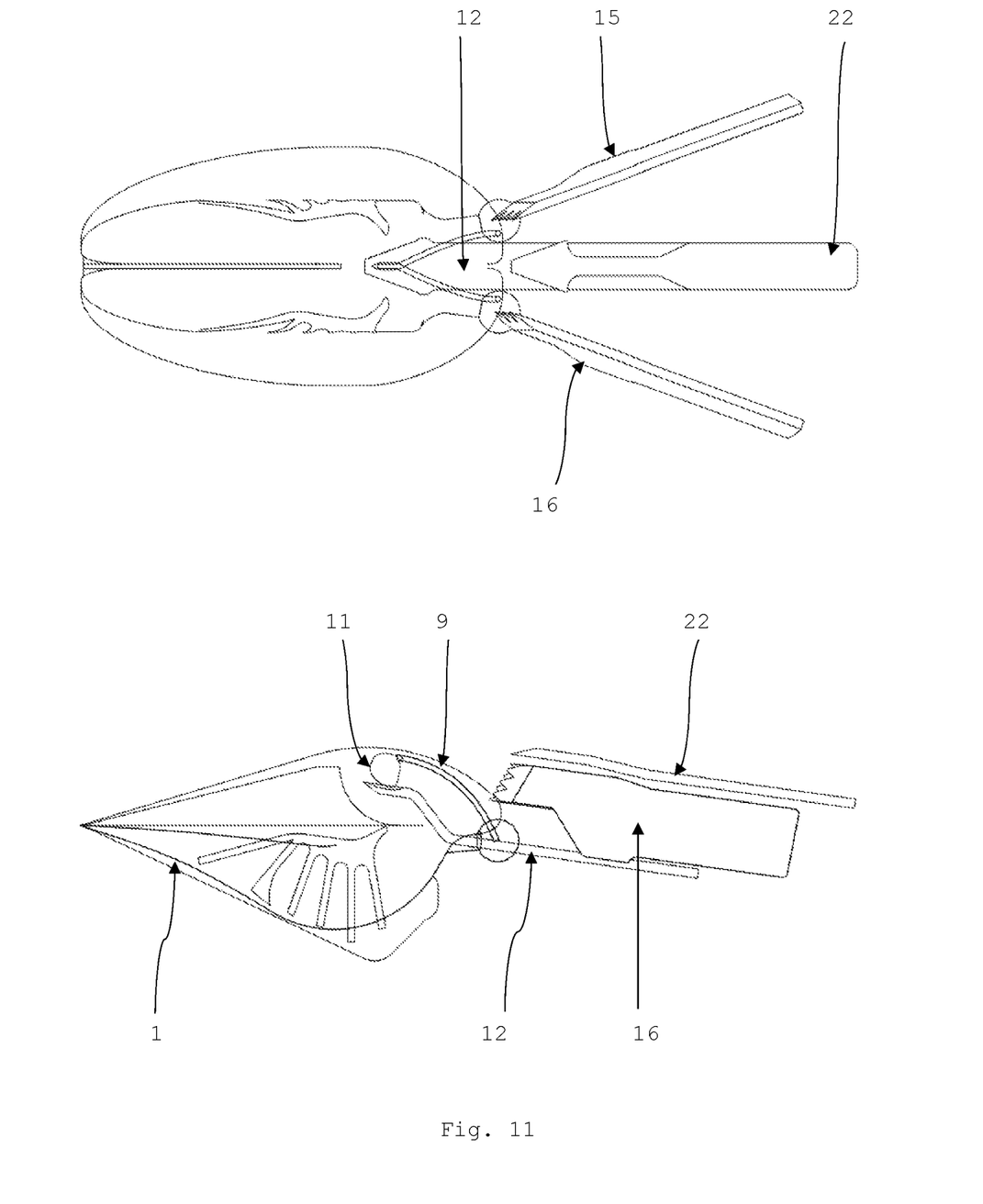
Figure 12:
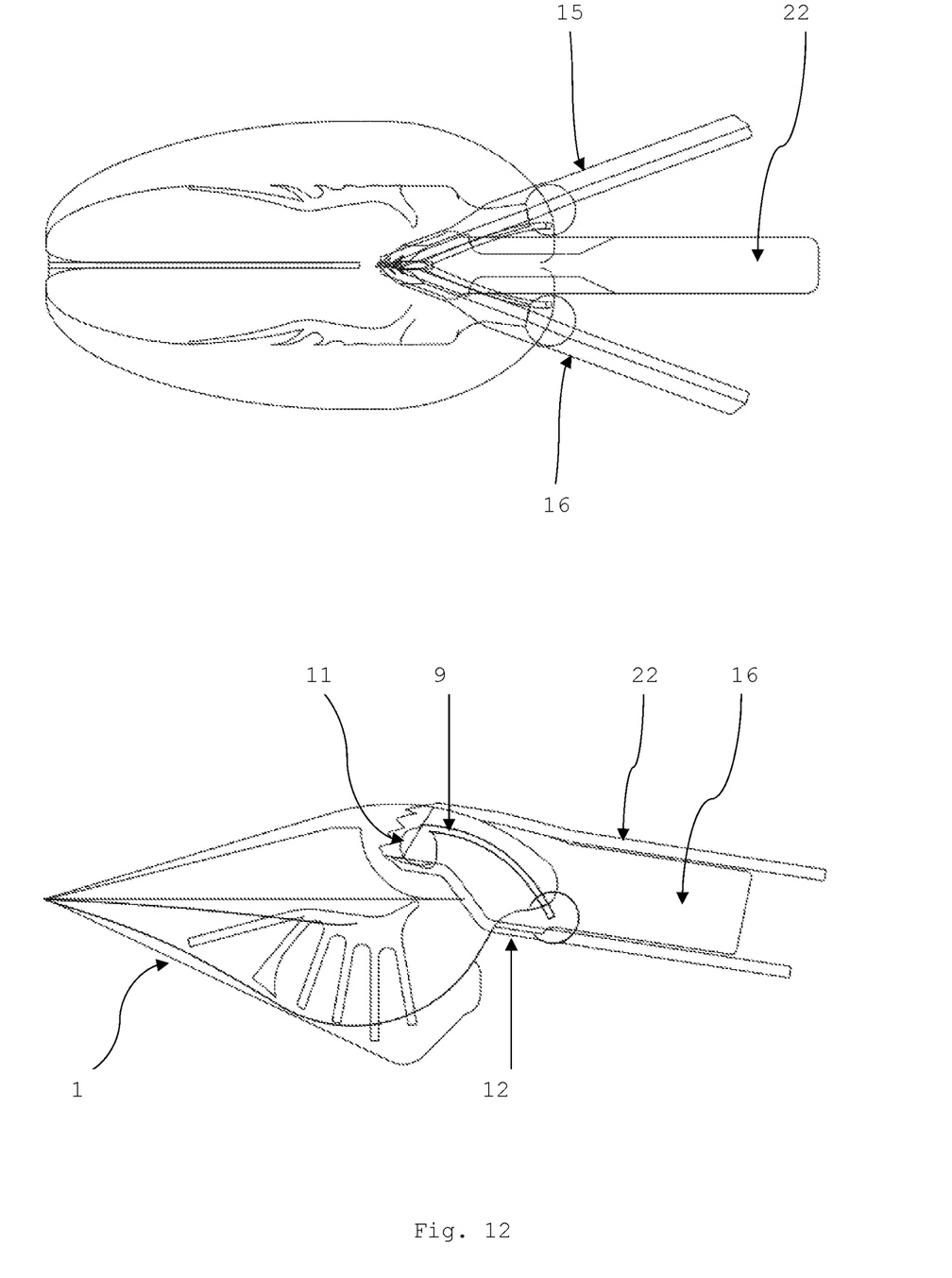

With reference to FIGS. 4-6 of the first exemplary embodiment and FIGS. 10-12 of the second exemplary embodiment, it is shown that for the formation of the cage in which (part of) the wishbone 9 will be trapped, the primary knife 12, the two secondary knives 15, 16 and the tertiary knife 22 are arranged to be operational in a preselected sequence. There are several options for this sequence. An exemplary option is shown in the figures wherein the primary knife 12 moves forward in a first direction to a position near to the wishbone head 11 (FIGS. 4 and 10), followed by a movement of the primary knife 12 towards the wishbone head 11 in a second direction being transverse to the first direction so as to engage and move the wishbone head 11 in the second direction. This results in the wishbone 9 performing a restricted rotation with reference to the wing joints 8 causing the wishbone 9 to be lifted (FIGS. 5 and 11). To complete the formation of the cage, the two secondary knives 15, 16 and the tertiary knife 22 are moved in so as to trap the wishbone 9 inside the thus formed cage (FIGS. 6 and 12).

It is also possible that the two secondary knives 15, 16 may be arranged to move synchronously with the movement of the primary knife 12 as explained above. Preferably the moving secondary knives 15, 16 progress along the wishbone legs 9', 9" in certain exemplary embodiments.

It is also possible that the two secondary knifes 15, 16 are arranged to progress along the wishbone legs 9', 9" before the primary knife 12 moves in the manner as explained above.

In the two above discussed sequences of operation it is preferable in certain exemplary embodiments that the two secondary knives 15, 16 are arranged to scratch over the wishbone legs 9', 9" to increase the yield of meat to be harvested from the carcass.

Figure 7:
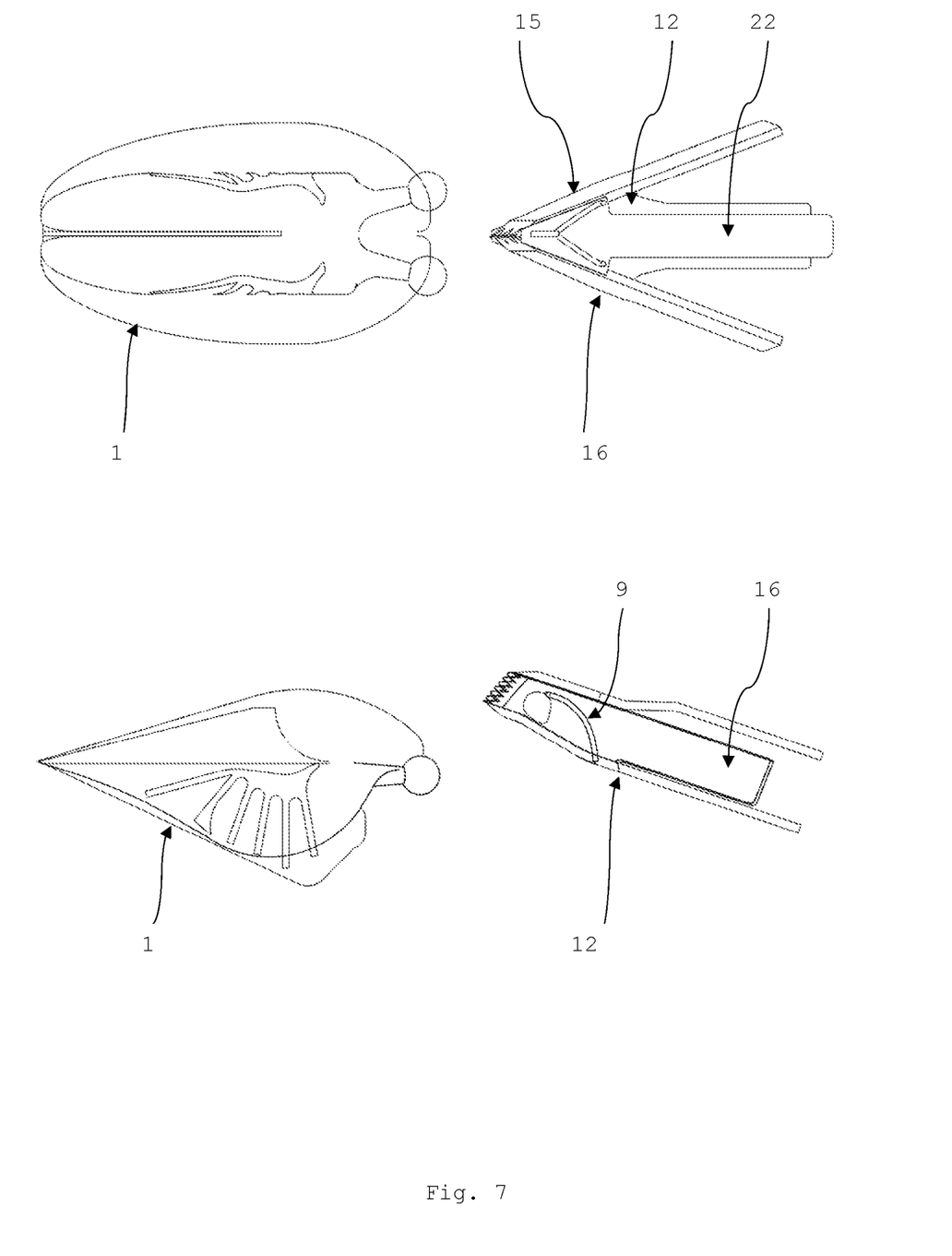
Figure 8:
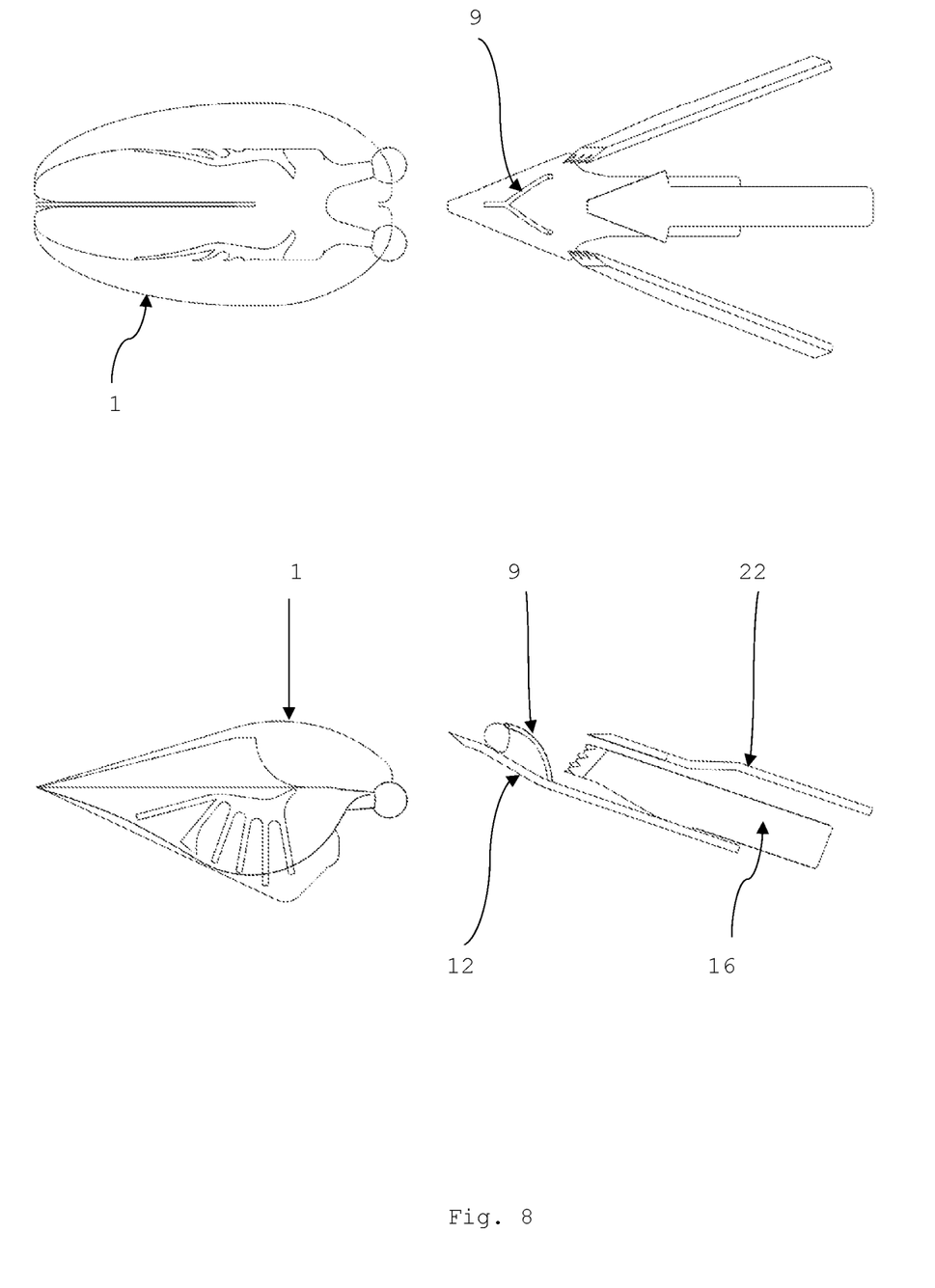
Figure 13:
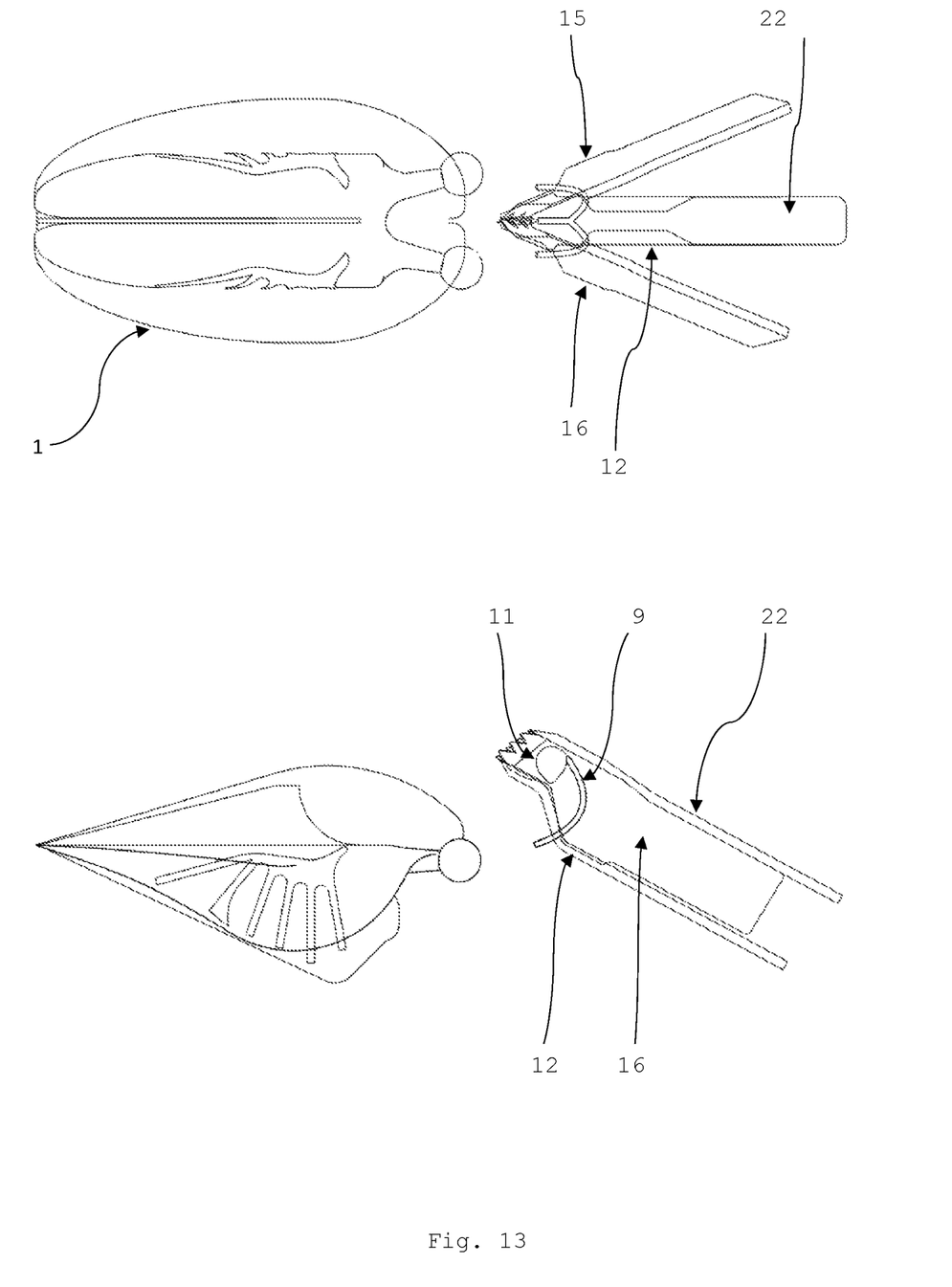
Figure 14:
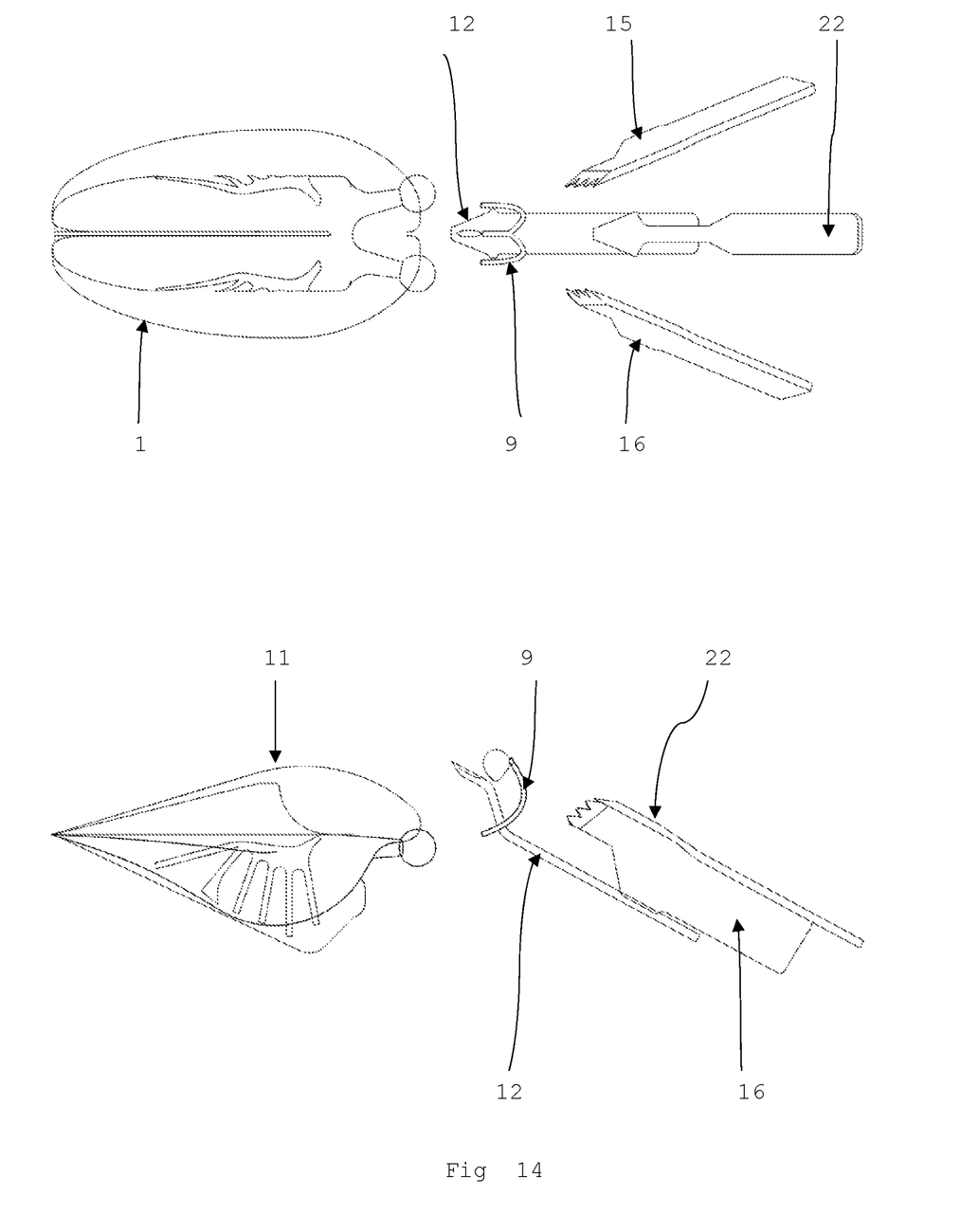

After the wishbone 9 is trapped within the cage provided by the primary knife 12, the two secondary knives 15, 16 and the tertiary knife 22 as is shown in FIGS. 6 and 12 respectively, the wishbone 9 or the parts of the wishbone within the cage may be removed from the carcass part 1. This removal of the wishbone 9 preferably takes place by a linear movement of the cage, or by a rotational movement of the cage. A rotational movement of the cage is most preferred, and this movement is depicted in FIGS. 7 and 13 respectively for the two discussed embodiments. In the final FIGS. 8 and 14 the cage is opened by a larger retraction of the two secondary knives 15, 16 and the tertiary knife 22 then the retraction of the primary knife 12. Accordingly, the removed wishbone 9 becomes visible.

Figure 15:
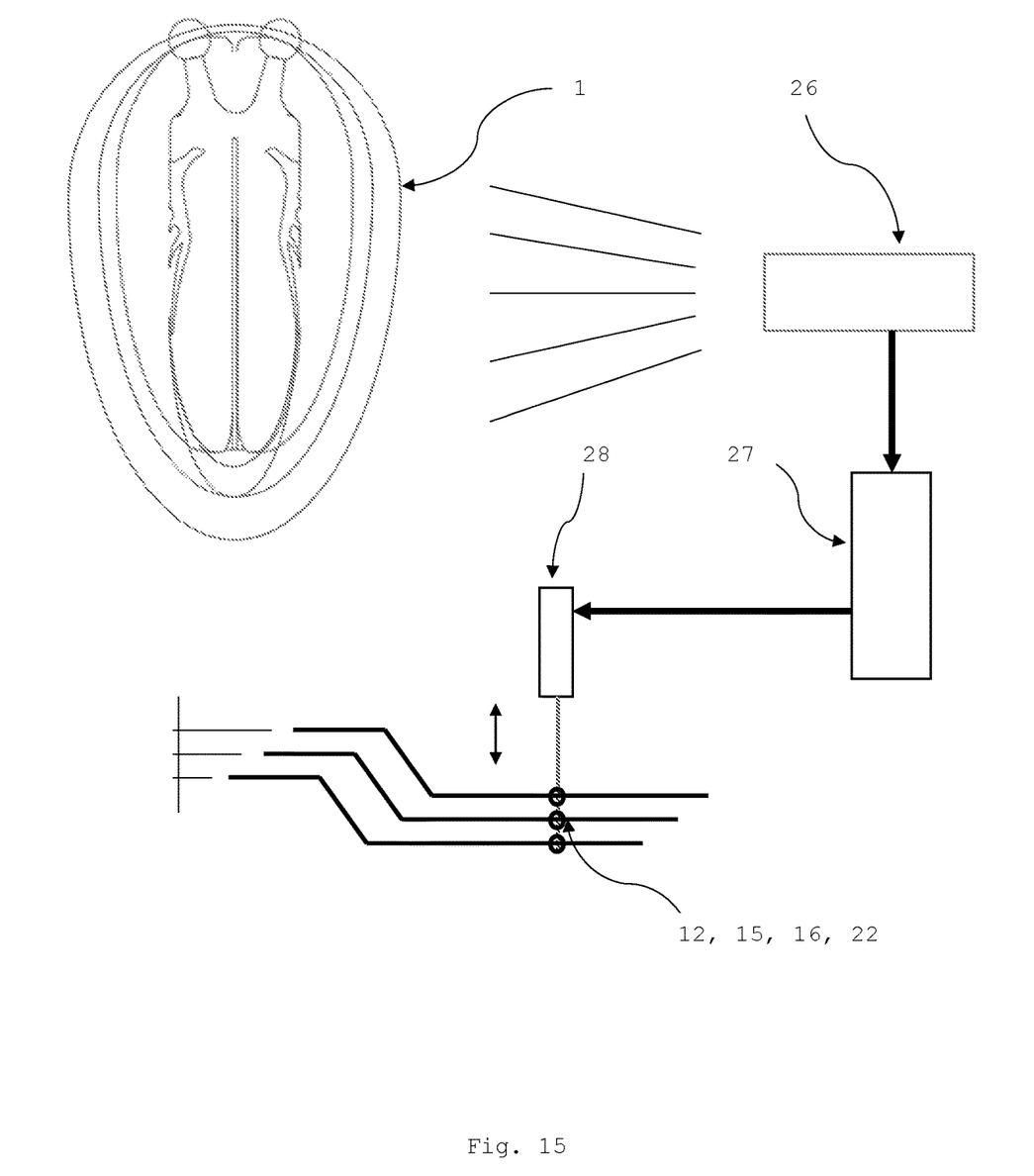
FIG. 15 shows the application of a monitoring tool.
Figure 16:
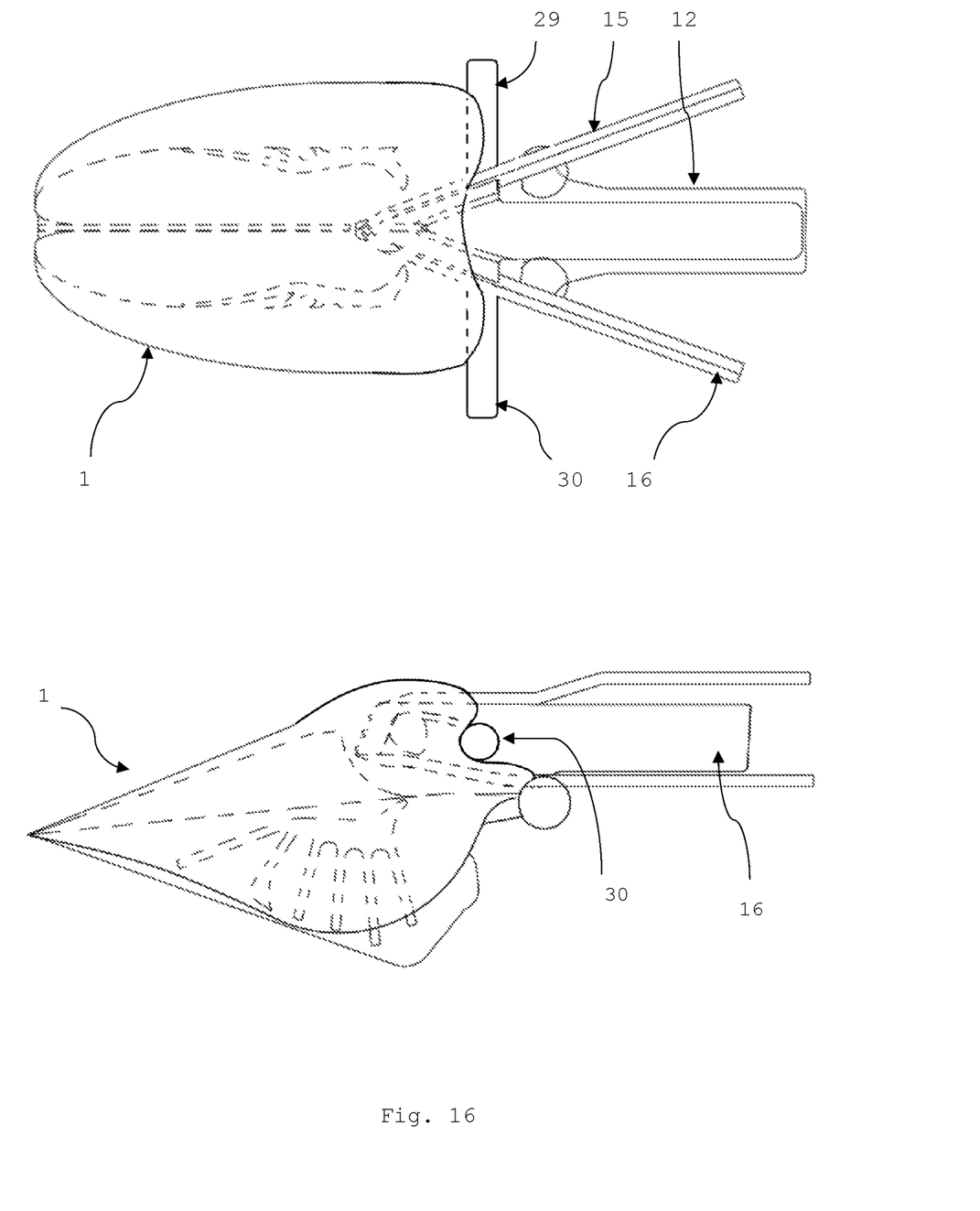
FIG. 16 shows the application of pushing rods that are added to the secondary knives of the device of the invention.

Possible variations to the embodiments disclosed herein are shown in FIGS. 15 and 16, respectively.

FIG. 15 depicts that the exemplary device is in position adjustable with reference to the carrier that is movable in the processing line wherein the carrier supports the poultry carcass 1 to be processed. For this purpose a monitoring tool 26, such as a camera, a CCD camera or another type of sensor, monitors the size of the poultry carcass 1. The monitoring tool 26 provides its information regarding the size of the poultry carcass 1 to a processor 27 which drives an actuator 28 that places the device of the invention, including the respective knives 12, 15, 16, 22 in the best position attuned for optimally processing the poultry carcass 1.

Also, as shown in FIG. 3, the exemplary device of the invention may be provided with a pushing organ or organs 29, 30, preferably arranged at the secondary knives 15, 16. These pushing organs 29, 30 serve to push the wishbone legs 9', 9" together into the cage in case that the wishbone is broken which is particularly advantageous in the first embodiment. Further, the device may also include organs or pushy organs 31, 32 as shown in FIG. FIG. 16, these organs being arranged to push the fillets away from the wishbone head 11.

Although the invention has been discussed in the foregoing with reference to exemplary embodiments of the method and device of the invention, the invention is not restricted to these particular embodiments which can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. A device for processing a carcass-part of slaughtered poultry in a processing line, the carcass-part supported on a carrier that is movable in the processing line, the carcass-part including wing-joints, coracoids, a wishbone embodied with two legs that merge into each other at an acute angle in a wishbone head, a keelbone, at least one membrana or ligament connecting at least to the wishbone, and meat including inner and outer fillets, the device comprising:

a tool for cutting the membrana and removing of the wishbone from the carcass-part, the tool comprising
a primary knife;
two secondary knifes arranged on opposite sides of the primary knife to disconnect the wishbone from the at least one membrana or ligament while retaining the meat on the carcass-part; and
a tertiary knife positioned or positionable adjacent to the two secondary knifes on a side of the secondary knifes opposite to the side where the primary knife is positioned or positionable so as to define a cage for trapping at least part of the wishbone head in the cage delimited by the primary knife, the two secondary knifes and the tertiary knife.

2. The device of claim 1, wherein the tertiary knife has a forward cutting edge.

3. The device of claim 1, wherein after formation of the cage by positioning of the primary knife, the two secondary knifes and the tertiary knife, the tertiary knife is jointly movable with the two secondary knifes and the primary knife for removal of the at least part of the wishbone while being trapped in the cage.

4. The device of claim 1, wherein while completing the cage, the primary knife and the two secondary knifes are configured to cut the membrana, ligament or both, loose from the wishbone.

5. The device of claim 1, wherein the cage is arranged to move so as to have the wishbone perform a restricted rotation with reference to the wing joints.

6. The device of claim 1, wherein the primary knife is at a forward end equipped with a recess which is arranged for receipt of the wishbone head.

7. The device of claim 1, wherein the two secondary knifes comprise thickenings in a selected region behind the forward ends of the two secondary knives, which thickenings are oriented towards each other and inwardly of the cage.

8. The device of claim 1, wherein the primary knife comprises cutting side edges configured for cutting the wishbone legs during the formation of the cage while the at least part of the wishbone head is trapped in the cage.

9. The device of claim 1, wherein for the formation of the cage, the primary knife, the two secondary knifes, and the tertiary knife are arranged to be operational in a preselected sequence, wherein the primary knife is arranged to move forward in a first direction to a position near to the wishbone head, followed by a movement of the primary knife towards the wishbone head in a second direction being transverse to the first direction so as to engage and move the wishbone head in the second direction, prior to the completion of the cage wherein the at least part of the wishbone is trapped.

10. The device of claim 1, wherein the two secondary knives progressing along the wishbone legs are arranged to move synchronously with the primary knife.

11. The device of claim 1, wherein the two secondary knifes are arranged to progress along the wishbone legs before the movements of the primary knife.

12. The device of claim 1, wherein the two secondary knifes are arranged to scratch over the wishbone legs.

13. The device of claim 1, wherein the device is in position adjustable with reference to the carrier that is movable in the processing line, wherein the position of the device depends on a monitoring tool that is arranged for establishing a size of the carcass part to be processed.

14. The device of claim 1, wherein the device is provided with a pushing organ or organs for pushing the wishbone legs together, for pushing the fillets away from the wishbone head, or both.

* * * * *